(12) United States Patent
Filipow et al.

(10) Patent No.: US 10,670,153 B2
(45) Date of Patent: Jun. 2, 2020

(54) PRESSURE PUMPING VALVES AND METHODS OF MAKING SUCH VALVES

(71) Applicant: Smith International, Inc., Houston, TX (US)

(72) Inventors: Sean A. Filipow, Houston, TX (US); Manjinder Singh, Corona, CA (US); Kevin LaComb, Sterling Heights, MI (US); Derek Owings, Sterling Heights, MI (US); David Fernholz, Sterling Heights, MI (US); Michael Fitzpatrick, Sterling Heights, MI (US)

(73) Assignee: SMITH INTERNATIONAL, INC., Houston, TX (US)

( * ) Notice: Subject to any disclaimer, the term of this patent is extended or adjusted under 35 U.S.C. 154(b) by 100 days.

(21) Appl. No.: 15/312,314

(22) PCT Filed: May 15, 2015

(86) PCT No.: PCT/US2015/031058
§ 371 (c)(1),
(2) Date: Nov. 18, 2016

(87) PCT Pub. No.: WO2015/179234
PCT Pub. Date: Nov. 26, 2015

(65) Prior Publication Data
US 2017/0089470 A1 Mar. 30, 2017

Related U.S. Application Data

(60) Provisional application No. 62/000,402, filed on May 19, 2014.

(51) Int. Cl.
*F16K 1/36* (2006.01)
*B23K 1/00* (2006.01)
(Continued)

(52) U.S. Cl.
CPC .............. *F16K 1/36* (2013.01); *B23K 1/008* (2013.01); *B23K 1/0008* (2013.01);
(Continued)

(58) Field of Classification Search
CPC  F04B 53/1025; F04B 53/1027; F04B 53/103; F04B 53/1032; F04B 53/1035;
(Continued)

(56) References Cited

U.S. PATENT DOCUMENTS 1,859,916 A * 5/1932 Eickmeyer .............. F16K 15/02
137/332
2,011,547 A * 8/1935 Campbell ........... F04B 53/1027
137/516.29
(Continued)

FOREIGN PATENT DOCUMENTS

| CN | 201651451 U | 11/2010 |
|---|---|---|
| CN | 201787094 U | 4/2011 |
| CN | 102182530 A | 9/2011 |

OTHER PUBLICATIONS

Search Report R. 62 EPC and European Search Opinion issued in European Patent Application No. 15795920.6 dated Feb. 15, 2018, 7 pages.
(Continued)

*Primary Examiner* — Kevin L Lee

(57) ABSTRACT

A method for joining a valve member for use within a valve, the method including brazing a body portion having a head and a base, the base having a bore extending a depth therein, to a leg portion having a shaft, the shaft having a distal end, a proximal end opposite the distal end, and a plurality of legs extending radially and axially therefrom and away from the proximal end, the brazing including placing a braze material between the bore and the proximal end, inserting the proximal end into the bore such that a portion of an outer surface
(Continued)

of the proximal end is adjacent to an inner surface of the bore, and heating at least the adjacent surfaces to a braze temperature.

19 Claims, 9 Drawing Sheets

(51) Int. Cl.
F16K 15/02 (2006.01)
F04B 53/10 (2006.01)
B23K 1/008 (2006.01)
F16K 15/06 (2006.01)
C21D 9/50 (2006.01)
C21D 9/00 (2006.01)
B23K 101/04 (2006.01)

(52) U.S. Cl.
CPC ............. *C21D 9/0068* (2013.01); *C21D 9/50* (2013.01); *F04B 53/1025* (2013.01); *F16K 15/028* (2013.01); *F16K 15/063* (2013.01); *B23K 2101/04* (2018.08)

(58) Field of Classification Search
CPC ............... F04B 53/109; F04B 53/1087; F04B 53/1095; F04B 53/1097; F16K 15/02; F16K 15/021; F16K 15/023; F16K 15/025; F16K 15/026; F16K 1/36; F02M 59/464; B23K 1/008
See application file for complete search history.

(56) References Cited

U.S. PATENT DOCUMENTS

| | | | |
|---|---|---|---|
| 3,871,339 A | 3/1975 | Kuhn | |
| 3,889,349 A * | 6/1975 | Kaufman | B22F 3/26 228/173.2 |
| 4,675,966 A * | 6/1987 | Franco-Ferreira | B23K 1/0008 29/434 |
| 4,766,930 A | 8/1988 | Patti | |
| 4,860,995 A * | 8/1989 | Rogers | F04B 53/1027 251/356 |
| 4,945,630 A | 8/1990 | Gellert | |
| 5,062,450 A | 11/1991 | Bailey et al. | |
| 5,082,020 A * | 1/1992 | Bailey | E21B 33/13 137/516.29 |
| 5,275,204 A * | 1/1994 | Rogers et al. | F04B 53/1027 137/516.29 |
| 5,639,062 A | 6/1997 | Irgens et al. | |
| 8,430,075 B2 * | 4/2013 | Qiao | C22C 38/02 123/188.3 |
| 2003/0015240 A1 | 1/2003 | Nelson et al. | |
| 2004/0262366 A1 * | 12/2004 | Kinstler | B23K 35/0244 228/119 |
| 2005/0103386 A1 | 5/2005 | Magda | |
| 2009/0250525 A1 | 10/2009 | Habermann et al. | |
| 2017/0342976 A1 * | 11/2017 | Nagaraja Reddy | E21B 43/16 |

OTHER PUBLICATIONS

International Written Opinion and Search Report for International Application No. PCT/US2015/031058, dated Aug. 13, 2015.(14 pgs).
International Preliminary Report on Patentability issued in corresponding International application PCT/US2015/031058 dated Dec. 1, 2016. 13 pages.
First Office Action issued in Chinese Patent Application No. 201580036933.9 dated Jun. 27, 2018, 21 pages.

* cited by examiner

PRESSURE PUMPING VALVES AND METHODS OF MAKING SUCH VALVES

BACKGROUND

A variety of different types of valves are known in the art and are generally used for the purpose of controlling the flow of a gas and/or fluid within a particular gas or fluid flow or transport system. One type of such known valves is a poppet valve that comprises a valve body having one or more fluid inlets and fluid outlets, a valve seat disposed within the body, and a movable poppet member disposed within the body. Fluid flow through the valve is affected by the placement position of the poppet member within the valve body relative to the valve seat.

For example, the poppet valve may be configured such that fluid flow through the valve body is effected by moving the poppet member from a closed position, where a portion of the poppet member is positioned or seated against the valve seat, to an open position, where the poppet member is moved relative to the valve seat to become unseated to thereby permit the flow of fluid through the valve. Poppet valves can be configured differently to address different system flow requirements, e.g., in an example embodiment fluid flow through a valve may instead occur when the poppet member is seated against the valve seat.

Poppet members known in the art are constructed having a head portion and a leg portion. Some poppet members are formed as one-piece via forging, casting, or machining. Sometimes, the head portion is machined from a forging while the leg portion is cast. When formed as a two-piece member, the poppet member portions may be joined together using conventional welding methodologies, e.g, stick, MIG, or inertial welding. However, these conventional welding methodologies may have increased cost and have concentricity issues between poppet member portions, thereby causing misalignment during operation in a valve.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method for joining a valve member for use within a valve that includes brazing a body portion having a head and a base, the base comprising a bore extending a depth therein, to a leg portion having a shaft. The shaft includes a distal end, a proximal end opposite the distal end, and a plurality of legs extending radially and axially therefrom and away from the proximal end. The brazing step includes placing a braze material between the bore and the proximal end, inserting the proximal end into the bore such that a portion of an outer surface of the proximal end is adjacent to an inner surface of the bore, and heating at least the adjacent surfaces to a braze temperature.

In another aspect, embodiments disclosed herein relate to a valve member for use within a valve including a body portion having a head and a base, wherein the base comprises a bore extending a depth therethrough, and a leg portion having a shaft and a plurality of legs extending radially and axially therefrom, the shaft being inserted into the bore and brazed to the body portion.

In yet another aspect, embodiments disclosed herein relate to a valve member for use within a valve including a body portion, and a leg portion having a shaft and three legs extending radially and axially therefrom.

In even yet another aspect, embodiments disclosed herein relate to a valve member for use within a valve including a body portion, and a leg portion having a shaft and a plurality of legs extending radially and axially therefrom, each leg having a face-proximal side directly facing the shaft and a face-distal side positioned to make contact with an inner bore of a valve seat within a valve. The total face-distal side arc length of the plurality of legs comprise 15 to 35 percent of the circumference of the leg portion or wherein the leg face-distal side height is at least 75% percent of the distance between a distal end of the leg to the proximal surface of the body portion.

Other aspects and advantages of the claimed subject matter will be apparent from the following description and the appended claims.

DETAILED DESCRIPTION

Figure 1:
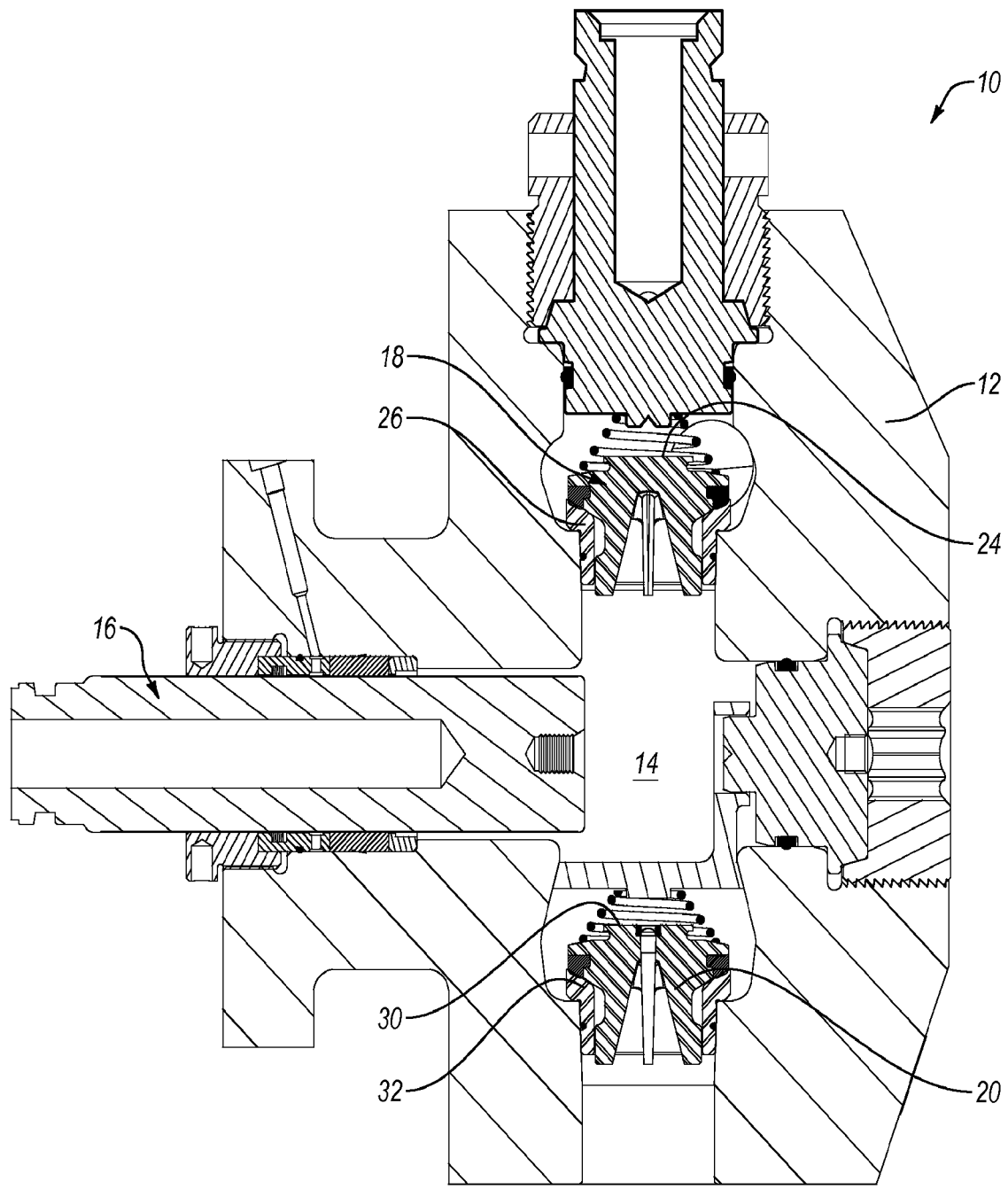
FIG. 1 is a cross-sectional view of a pressure pumping valve including two conventional valve members.

Embodiments of the present disclosure relate to valve members, e.g., poppet valve members. Certain aspects relate to two piece valve member components that are brazed together to form poppet valve members. Other aspects relate to poppet valve members that have a modified number of legs and/or modified leg geometry to, for example, provide greater stabilization of the valve within a valve seat.

Poppet valve members are used in a variety of different types of valves and valve applications. For example, poppet valve members may be used in MacClatchie valves, which are pump valves used in conjunction with a reciprocating piston pump to effect fluid (including slurry) transport. FIG.

1 illustrates a cross-sectional view of a section 10 of such an example pump valve including a body 12 configured having a fluid-transport channel 14 disposed therein, and a reciprocating piston 16 in fluid-flow communication with the channel 14.

A pair of poppet valve members 18 and 20 is positioned within the fluid-transport chamber 14 to provide fluid transport through the valve in response to the movement of the piston 16. A first valve member 18 is located at an upper end 22 of the channel 14, and is biased by a spring 24 into seated engagement with a first valve seat 26 that is fixedly attached to the channel. A second valve member 20 is located at a lower end 28 of the channel 14, and is biased by a spring 30 into seated engagement with a second valve seat 32 that is fixedly attached to the channel.

Arranged in this manner, movement of the piston 16 outwardly away from the channel 14 causes the second valve member to move upwardly against the spring bias to become unseated from the second valve seat 32 and permit the passage of fluid into the channel 14. While a reversed movement of the piston 16 inwardly into the channel 14 causes the second valve member 20 to be seated against the second valve seat 32, and causes the first valve member 18 to move upwardly against the spring bias to become unseated from the first valve seat 26 and permit the passage of fluid outwardly from the channel 14. The valve members 18 and 20 illustrated in FIG. 1 are known in the art and include an elastomeric sealing element 34 disposed along an outer surface of the valve member for seating against the respective first and second valve seats 26 and 32.

Some embodiments disclosed herein relate to methods for joining a multi-piece valve member for use within a valve, and such valves may be used in the pressure pumping valve as shown in FIG. 1. In particular, not only are the embodiments disclosed herein generally more cost effective than conventional valve members, but they may eliminate or reduce concentricity issues that arise during conventional valve member manufacture, thereby resulting in valve members having tighter concentricity.

Figure 3:
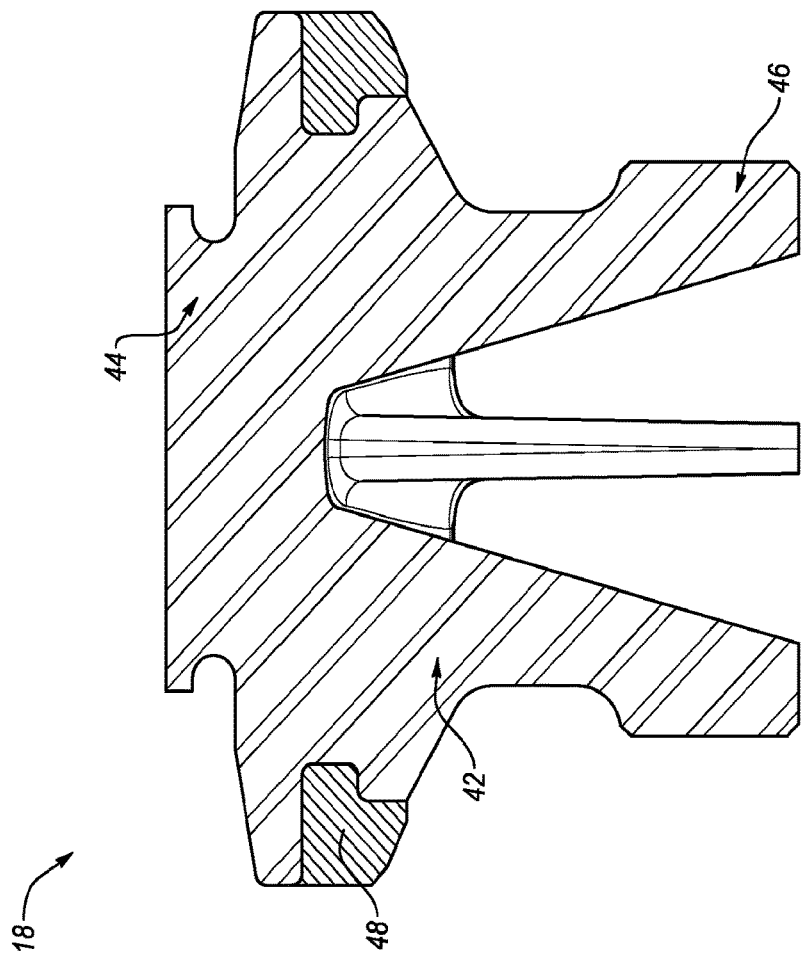
FIG. 3 is a cross-sectional view of a conventional valve member.
Figure 2:
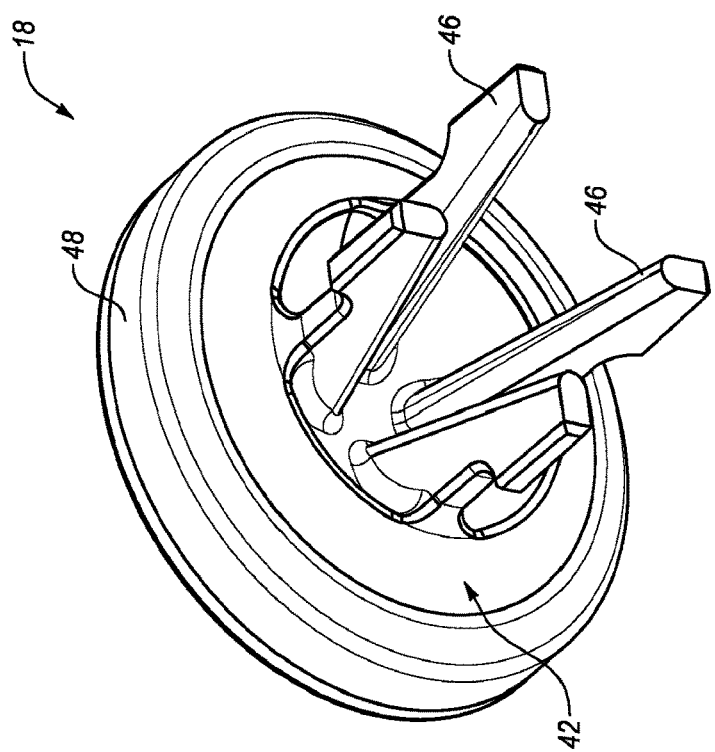
FIG. 2 is a perspective view of a conventional valve member.
Figure 4:
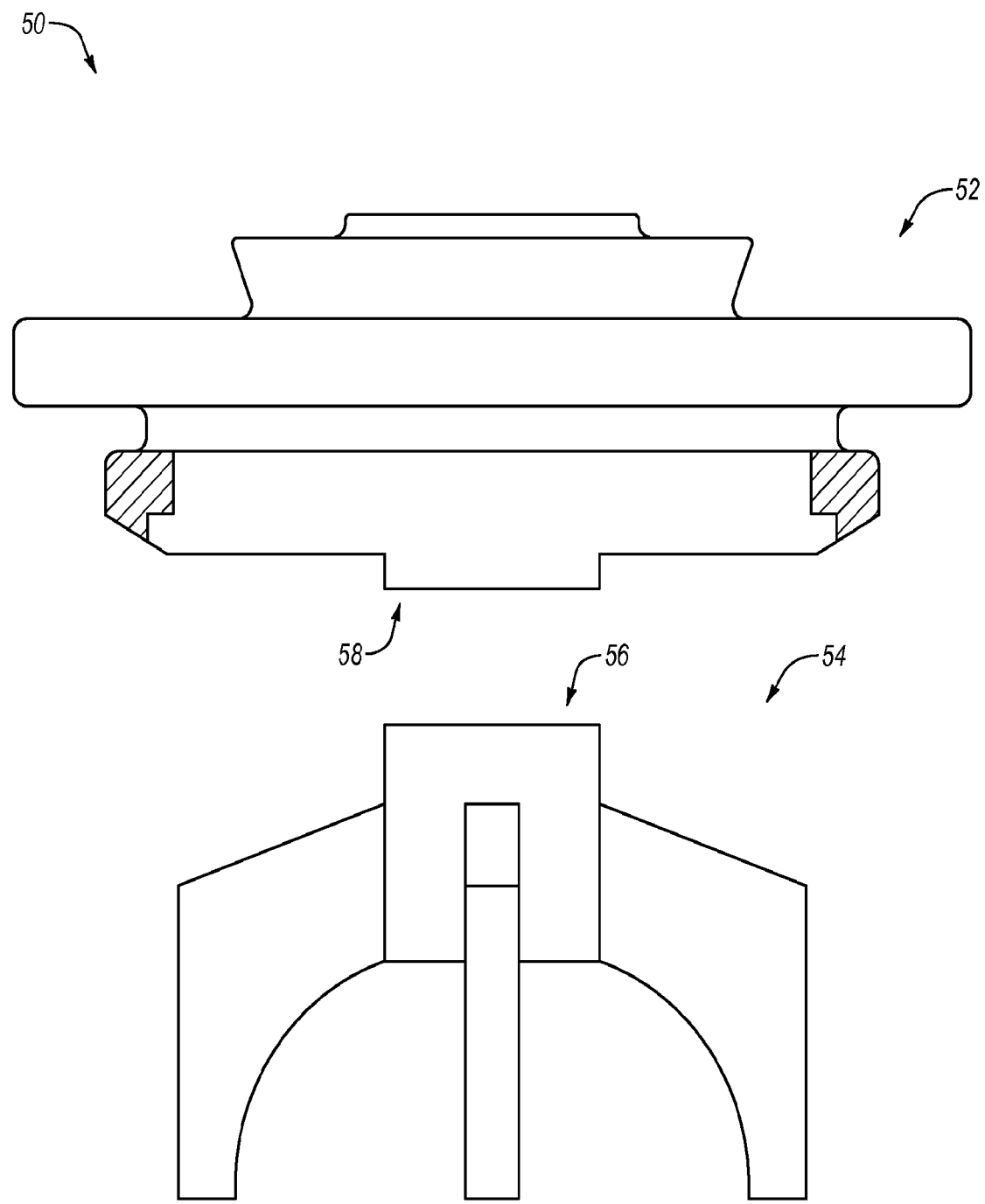
FIG. 4 is a cross-sectional view of a conventional valve member.

FIGS. 2 and 3 show the conventional valve member 18 illustrated in FIG. 1, including a metallic body 42 having a circular head 44 at one end, and having a plurality of legs 46 projecting axially a distance away from the head. As illustrated, the valve member 18 also includes a sealing element 48 that is disposed circumferentially around a portion of the head at a location designed to engage a valve seat when the valve member 18 is placed within a valve body. The valve members shown in FIGS. 2 and 3 are one-piece members; however, other conventional valve members may be multi-piece members and joined using conventional welding methodologies, e.g, stick, MIG, or inertial welding, to join portions of a valve member. Such a conventional two-piece valve member is illustrated in FIG. 4. As shown, the valve member includes body portion 52 and leg portion 54, which are joined together by welding the shaft 56 of leg portion 54 to stub 58 extending axially from body portion 52.

Figure 5:
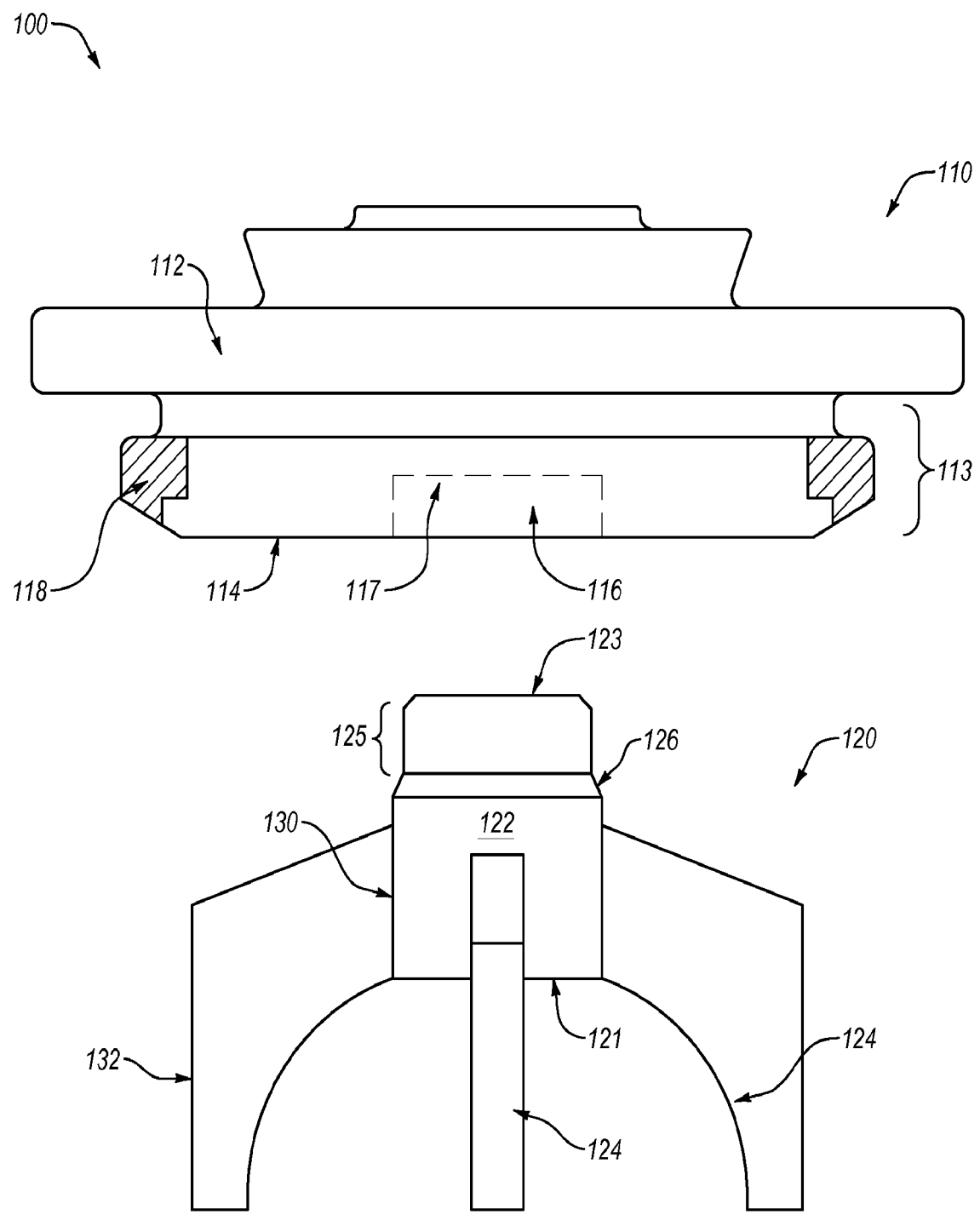
FIG. 5 is a side view, partially in cross-section, of valve member portions according to embodiments of the present disclosure.

Referring now to FIG. 5, a side view, partially in cross-section, of valve member portions to be joined in accordance with methods of the present disclosure is shown. As shown in FIG. 5, the poppet valve member 100 includes a body portion 110 and a leg portion 120. The body portion 110 is substantially circular when viewed from its longitudinal axis and having a head 112 and a base 114. The body portion 110 may have at least two different diameters, wherein the diameter of the head 112 is larger than the diameter of the base 114. The base 114 includes a bore 116 extending a depth through the longitudinal axis of the base 114. Radially surrounding the opening of bore 116 is the proximal surface of the base 114, which is illustrated as being substantially planar, but the present disclosure is not so limited. Rather, such proximal surface of the base 114 may be non-planar, such as a truncated substantially conic surface or truncated substantially paraboloid surface (i.e., having a radius of curvature along a cross-sectional view). The body portion 110 includes a side section 113 interposed axially between the head 112 and base 114 (also referred to in the art as a strike face), and that extends circumferentially around the body portion 110.

The leg portion 120 includes a shaft 122 having a distal end 121 and a proximal end 123 opposite from the distal end 121. The shaft 122 may include a reduced diameter section 125 extending a distance from the proximal end 123 towards distal end 121. The reduced diameter section 125 transitions to the outer diameter of the shaft 122 at shoulder 126. Shoulder 126 may have either a perpendicular or otherwise angled face relative to the shaft surfaces on both axial sides of shoulder 126. The shaft 122 has a plurality of legs 124 extending radially and axially therefrom and away from the proximal end 123, as shown in FIG. 5. Each leg 124 has a face-proximal side 130 directly facing the shaft 122 and a face-distal side 132 positioned to make contact with an inner bore of a valve seat within a valve.

Figure 6:
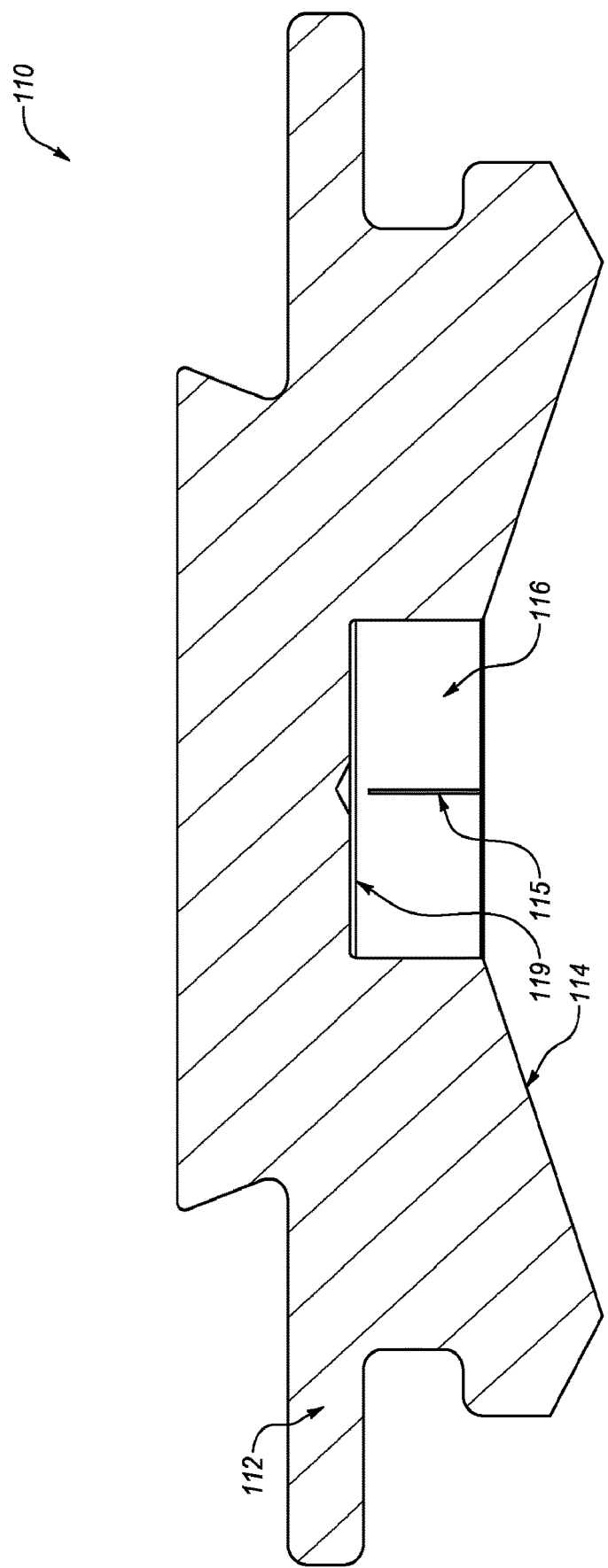
FIG. 6 is a cross-sectional view of a body portion of a valve member according to embodiments of the present disclosure.

Referring now to FIG. 6, another embodiment of a body portion 110 is shown. As shown, the body portion is substantially circular when viewed from its longitudinal axis and includes a head 112 and a base 114. The body portion 110 may have at least two different diameters, where the diameter of the head 112 is larger than the diameter of the base 114. The base 114 includes a bore 116 extending a depth through the longitudinal axis of the base 114. Radially surrounding the opening of bore 116 is the proximal surface of the base 114, which is illustrated as being a truncated paraboloid surface. That is, the proximal surface of base 114 has a radius of curvature along the cross-sectional view, which is, in various embodiments, greater than the outer diameter of the proximal surface. At the intersection of the bore 116 and proximal surface of the base 114, there may be a radiused or beveled transition surface therebetween. Further, the valve member may optionally include at least one axial groove 115 in an inner circumferential wall of the bore 116 (and/or a radial surface of a shaft of the leg portion 122) to facilitate air ventilation during assembly. Axial groove 115 may, in various embodiments, range from 0.001 to 0.050 inches (0.025 to 1.270 millimeters) wide and/or from 0.001 to 0.050 inches (0.025 to 1.270 millimeters) deep into the body. Other embodiments may have a lower limit (for either width or depth) of any of 0.001, 0.002, 0.005, 0.010, or 0.020 inches and an upper limit (for either width or depth) of any of 0.010, 0.020, 0.025, 0.030, 0.040, or 0.050 inches, where any lower limit can be used in combination with any upper limit.

Characteristics of an axial groove may be expressed relative to the interference fit between the body and leg portions once assembled. For example, an axial groove depth to interference fit ratio (d) may be calculated using the equation, $d=g/(s-b)$, where g is the groove depth, s is the shaft diameter, and b is the bore diameter, wherein the interference fit is characterized by $(s-b)$. Axial groove depth to interference fit ratio (d) may range from about 0 to about 50, or with a lower limit of any of 0, 0.01, 0.03, 0.05, or 0.08 and an upper limit of any of 16, 25, 35, or 50, where any lower limit can be used in combination with any upper limit.

Further, in some embodiments, the axial groove 115 extends from the opening of the bore 116 (i.e. at the proximal surface of the base 114) axially into the body away from the proximal surface (or the corresponding portion of the radial surface of the shaft, i.e., extending from the proximal end 123 towards the shoulder 126 of the shaft 122). In various embodiments, the axial groove 115 may extend at least 50% of the bore depth and/or the length of the radial surface of the shaft, or at least 60%, 75% or 85% in other embodiments.

In addition to the optional one or more axial grooves 115, the bore may also include one or more other optional surface alterations in the bottom or distal surface of the bore to improve braze flow and distribution. That is, while FIG. 5 illustrates a planar bottom surface 117, the embodiment illustrated in FIG. 6 includes a non-planar bottom surface 119, including at least one dimple formed therein. In such embodiments, the bore bottom surface may include at least one overflow space, a slight conical shape, at least one spacing detent, or combinations thereof, to improve braze flow and distribution and/or to facilitate air ventilation during assembly. A spacing detent may have a diameter ranging from about 0 to about 0.050 inches, or range from 0.015 to 0.035 inches in or more embodiments.

Body portions of a multi-piece valve member may be formed from a steel material or other metal alloy. For example, according to some embodiments, a body portion may be machined from a forging, casting, or bar stock of a steel alloy, for example, 8620 steel, 4140 steel, 4820 steel, 9310 steel, 43B20 steel, or stainless steel, or other metallic alloys such as aluminum alloys. However, any suitable material may be used to form the body portion. In such embodiments, the bore may be formed with the body portion itself or machined a depth into the base of the body portion. Leg portions of a multi-piece valve member may also be formed from a steel material, other metal alloy, or other suitable material. For example, according to some embodiments, a leg portion may be formed by investment casting of steel having 0.05 to 1.00 percent carbon by weight, or from 0.10 to 0.5 percent carbon by weight in other embodiments.

In some embodiments, the body and leg portions are formed such that once assembled, the two portions having an eccentricity of substantially zero (and the two portions may have an interference fit). In some embodiments, the body and leg portions may be formed to have a maximum concentricity tolerance of 0.03 inches (0.381 millimeters), less than 0.015 inches (0.381 millimeters), or less than 0.010 inches (0.254 millimeters). Concentricity may be defined as the quality of having the same center where two members having a concentricity tolerance of nil are considered concentric, or having the same center, whereas concentricity tolerance is the distance between the centers of the two members, or offset.

Methods for joining a multi-piece valve member according to embodiments of the present disclosure include providing portions of a multi-piece valve member and brazing the portions into a unitized assembly, or valve member. For example, in some embodiments, methods include providing a body portion and a leg portion of a valve member, providing a braze material between the shaft proximal end and the bore, and pressing the proximal end of the shaft into the bore such that a portion of an outer surface of the proximal end is adjacent to an inner surface of the bore, or such that the shoulder of the shaft is adjacent to the base of the body portion. The braze material may be in the form of, for example, a substantially circular wire, a thin disk, a paste, or a powder. Such braze materials may be composed of aluminum, copper, nickel, combinations thereof, or alloys thereof, but the braze material is not limited thereto. The portions may then be joined by heating at least the adjacent surfaces and braze material to a braze temperature ranging from 2,000 to 2,300 degrees Fahrenheit (1,093 to 1,260 degrees Celsius) in any suitable atmospheres, such as a reducing atmosphere. However, depending on the selected braze material, other braze temperatures may be used. In addition, in some embodiments, flux may be used.

To maximize the production of valve members, a furnace may be used to braze a plurality of valve members simultaneously or sequentially. There may be contiguous zones within the furnace where pre-heating, heating (brazing), and heat treating phases may occur, in that order. Preheating the portions in an oxidizing atmosphere to a predetermined or set temperature above the temperature at which oxidation readily occurs but below the brazing temperature may reduce the heat input required during the brazing phase. After the brazing phase, heat treatment of the valve members may occur to improve the hardness and strength of the valve member. Valve members may be heat treated at temperatures ranging from 1,500 to 1,800 degrees Fahrenheit (816 to 982 degrees Celsius) for a period ranging from 8 to 14 hours such that the valve members achieve a hardened case depth of at least 45 or 50 HRC to a minimum depth of 0.030 inches (0.762 millimeters). Valve members may then be equalized by cooling to temperatures ranging from 1,300 to 1,700 degrees Fahrenheit (704 to 927 degrees Celsius). Upon equalization, the valve members may be quenched in agitated oil or polymer and allowed to cool to room temperature.

To achieve the desired hardness and microstructure, the valve members may be tempered at temperatures ranging from 300 to 500 degrees Fahrenheit (149 to 260 degrees Celsius) for about 2 hours and then allowed to cool to room temperature. The valve members may achieve a hardness differential through the depth of the valve member, having a final hardness of at least 45 HRC or between 50 and 70 HRC at the case (to a minimum depth of 0.030 inches (0.762 millimeters), and in some embodiments, at least 0.050 inches (1.27 millimeters) or 0.060 inches (1.524 millimeters), with a decreasing hardness at greater depths into the valve member, that may reach a core depth having a hardness less than 40 HRC, 35 HRC, or 25 HRC. To further facilitate production, a conveyor system may be used to feed the valve members through the contiguous zones of the furnace.

Figure 7:
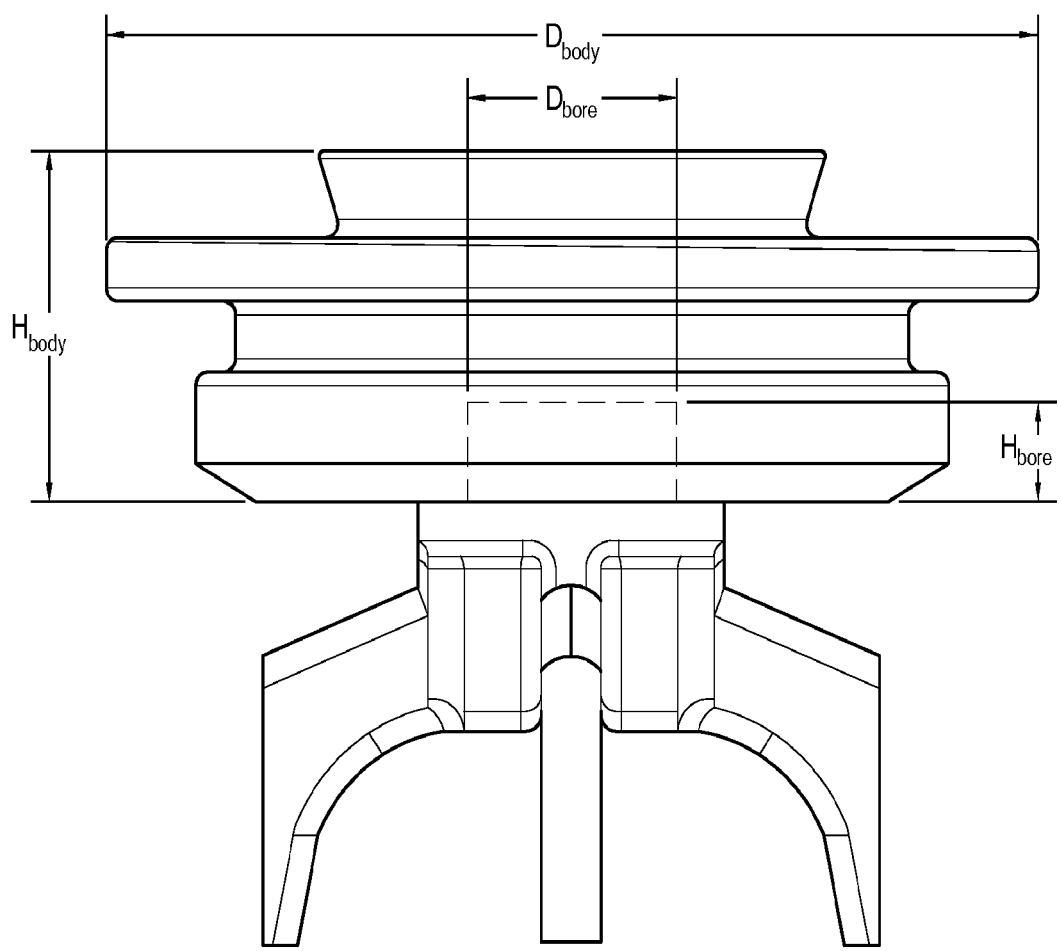
FIG. 7 is a side view of a valve member according to embodiments of the present disclosure.

Referring now to FIG. 7, a side view of a valve member in accordance with embodiments of the present disclosure is shown. According to embodiments of the present disclosure, the bore depth, $H_{bore}$, to body portion height, $H_{body}$, ratio may range from about 0.05 to about 1.00, or with a lower limit of any of 0.05, 0.10, 0.20, 0.25, or 0.35 and an upper limit of any of 0.50, 0.60, 0.75, 0.85, or 1.0, where any lower limit can be used in combination with any upper limit. Further, the bore diameter, $D_{bore}$, to body diameter, $D_{body}$, ratio may range from about 0.10 to about 0.60 in some embodiments, but in other embodiments, may have a lower limit of any of 0.10, 0.15, 0.20, or 0.25 with an upper limit of any of 0.40, 0.50, or 0.60, where any lower limit can be used in combination with any upper limit. The dimensions of the bore may provide additional shearing strength to the joined valve member due to the bearing surface area the bore provides to the inserted shaft therein.

According to embodiments of the present disclosure, the proximal end of the shaft and/or the bore may include a substantially smooth surface to facilitate a capillary action during brazing. In such embodiments, surfaces to be brazed may have a surface finish ranging from about 2 to about 1,000 Ra microinches (0.05 to 25 Ra micrometers), or between 2 and 250 Ra microinches (0.05 to 6.3 Ra micrometers) in other embodiments. However, other embodiments may include one or more textured surfaces with a greater surface roughness. Further, the proximal end of the shaft may include at least one detent creating space between the proximal end and the bore bottom, at least one dimple, at least one axial groove, or combinations thereof, to improve braze flow and distribution and/or to facilitate air ventilation during assembly.

The inserted portion of the shaft may extend the entirety of the bore depth or a distance less than the bore depth, for example, due to detents on the proximal end of the shaft, the bore bottom, or combinations thereof, such that there is a clearance between the shaft and bore bottom. The brazing material may occupy any portion of the clearance space. In such embodiments, the clearance may range from 0.00 to 0.05 inches (0.00 to 1.27 millimeters) between the proximal end of the shaft and the bore bottom, or a clearance ranging from 0.0005 to 0.0160 inches (0.013 to 0.406 millimeters) or 0.001 to 0.004 inches (0.025 to 0.102 millimeters). The surface area to be brazed ($A_b$) may be calculated using the equation, $A_b = \pi*(b/2)^2 + k*\pi*b*h$, where b is the bore diameter (ranging from 0.3 inches (7.62 millimeter) to 3.6 inches (91.44 millimeters), for example), k is percent of bore depth brazed (ranging from greater than 0 to 1, or from about 0.05 to 1), and h is the bore depth (ranging from 0.050 inches (1.27 millimeters) to 3 inches (76.2 millimeters). That is, assuming a bore diameter range of 0.3 inches (7.62 millimeter) to 3.6 inches (91.44 millimeters), and a bore depth ranging up to 3 inches (76.2 millimeters), the braze area ($A_b$) may range from about 0.07 square inches (45.16 square millimeters) to about 44.10 square inches (28451 square millimeters). In various embodiments, the braze area may be greater than $0.5\pi$ times the square of the bore diameter, and in varying embodiments, may be at least $0.75\pi$, $1\pi$, or $2\pi$ times the square of the bore diameter and up to the sum of r times the square of the bore diameter and $\pi$ times the height of the bore and the bore diameter.

Figure 10:
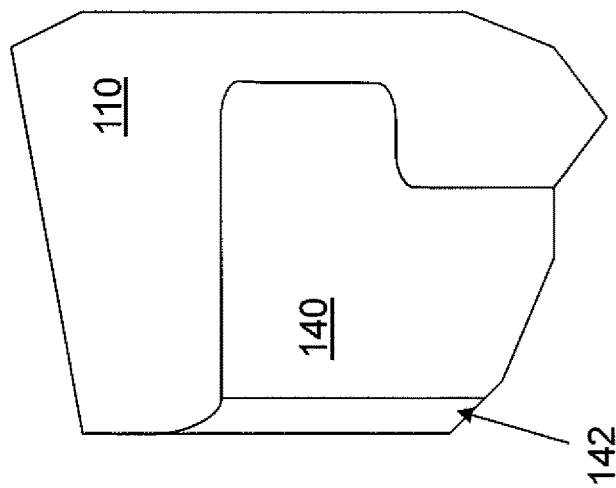
FIG. 10 is a cross-sectional view of a sealing element according to embodiments of the present disclosure.
Figure 9:
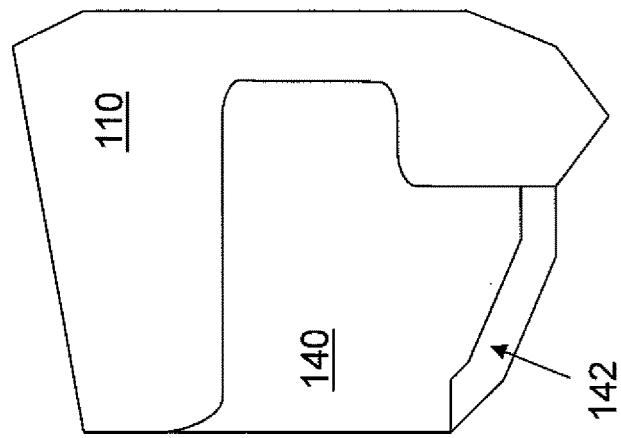
FIG. 9 is a cross-sectional view of a sealing element according to embodiments of the present disclosure.
Figure 8:
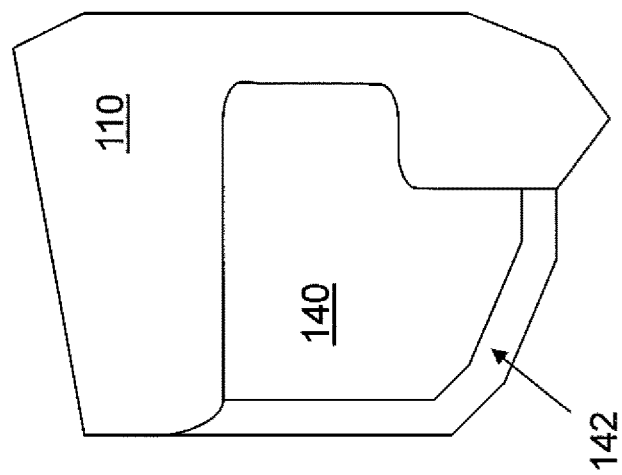
FIG. 8 is a cross-sectional view of a sealing element according to embodiments of the present disclosure.

According to embodiments of the present disclosure, a sealing element 118 is disposed in the side section 113 and extends circumferentially therearound for making contact with a valve seat within a valve. Referring now to FIGS. 8-10, cross-sectional views of a sealing element in accordance with embodiments of the present disclosure is shown. The sealing element 118 may include an elastomeric body 140 and a non-elastomeric material 142 disposed along an outside surface of at least a portion of the elastomeric body 140. In some embodiments, elastomeric materials useful for forming the elastomeric body may include polymers capable of undergoing a desired amount of elastic deformation to provide a leak-tight seal with a valve seat. Suitable elastomeric materials for use may include nitrile, highly saturated nitrile, carboxylated nitrile, natural rubber, fluoropolymer, urethane, and combinations thereof, but any suitable elastomeric materials may be used. In some embodiments, materials useful for forming the non-elastomeric layer include materials capable of providing an improved degree of abrasion resistance to the underlying elastomeric body, and/or that are also capable of providing support or rigidity to the elastomeric body. Suitable non-elastomeric materials for use may include those provided in the form of a fabric selected from the group including those formed from aramid fibers such as Kevlar, and also cotton, nylon, polyester, and combinations thereof, but the non-elastomeric materials are not limited thereto. In some embodiments, the non-elastomeric material is a fabric material that is impregnated with the elastomeric material used to form the elastomeric body, and is attached to at least a portion of the elastomeric body outer surface during a molding process used to form the sealing element 118. Thus, the resulting composite seal element 118 includes fabric material integrally bonded with the underlying elastomeric body.

Figure 11:
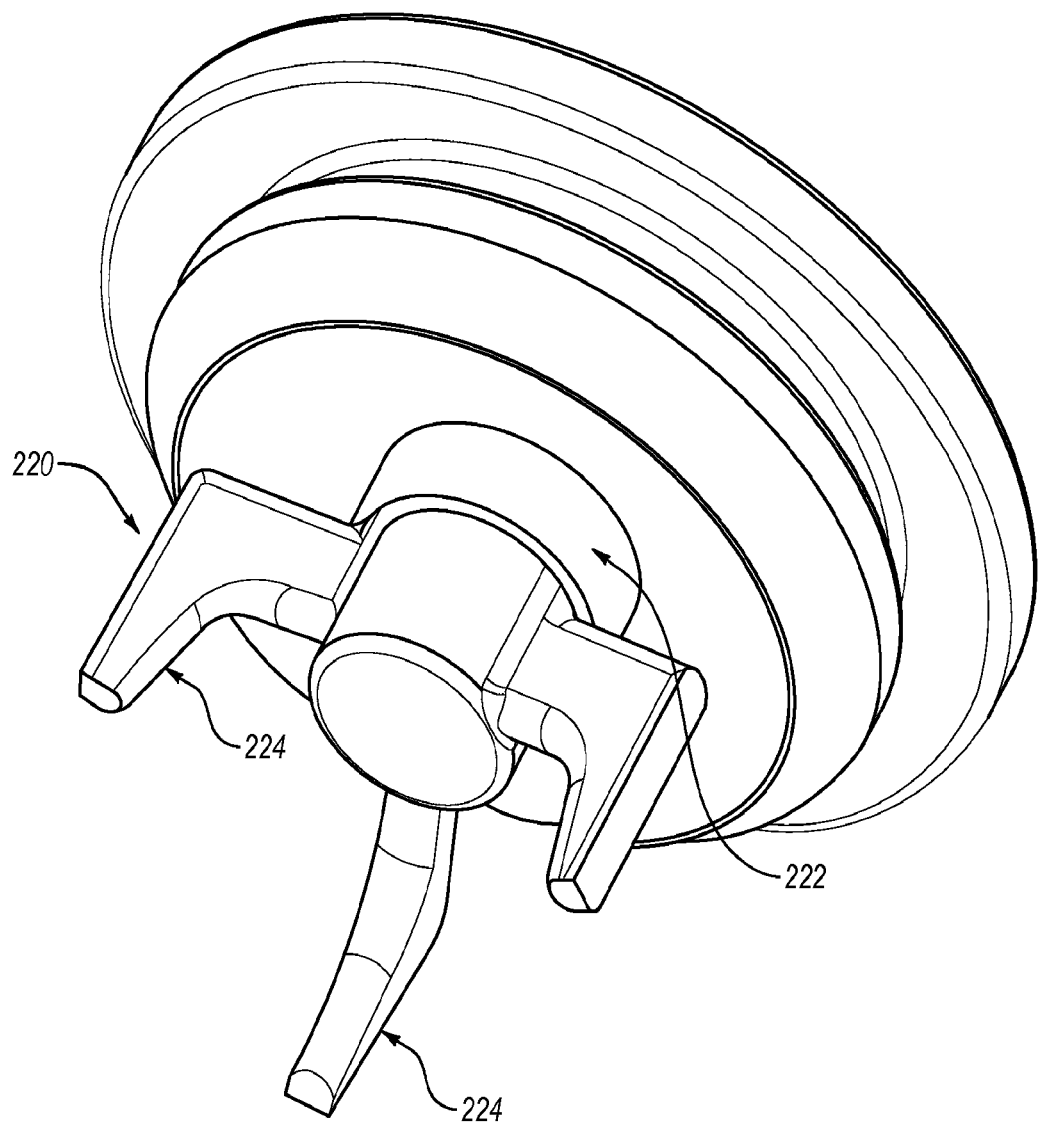
FIG. 11 is a perspective view of a valve member according to embodiments of the present disclosure.

Referring now to FIG. 11, a perspective view of a valve member in accordance with embodiments of the present disclosure is shown. In some embodiments, the leg portion 220 may include fewer than four legs, such as three legs 224 extending radially and axially from the shaft 222. However, in some embodiments, the leg portion may include two legs. Using less legs than the industry standard of four legs, uses less material, reduces manufacturing time and cost, and lessens the obstruction to fluid flowing through the valve.

Figure 14:
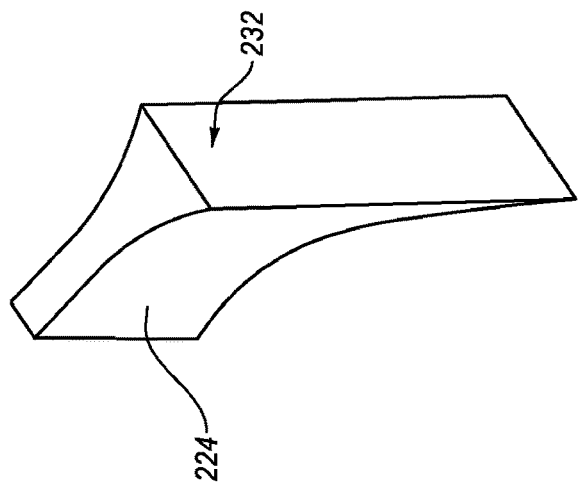
FIG. 14 is a perspective view of a valve member leg according to embodiments of the present disclosure.
Figure 13:
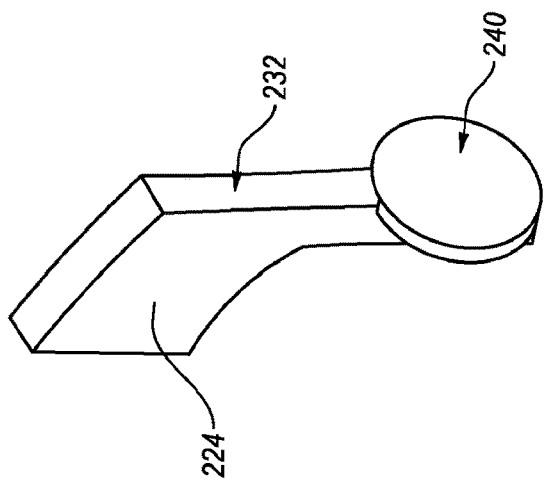
FIG. 13 is a perspective view of a valve member leg according to embodiments of the present disclosure.
Figure 12:
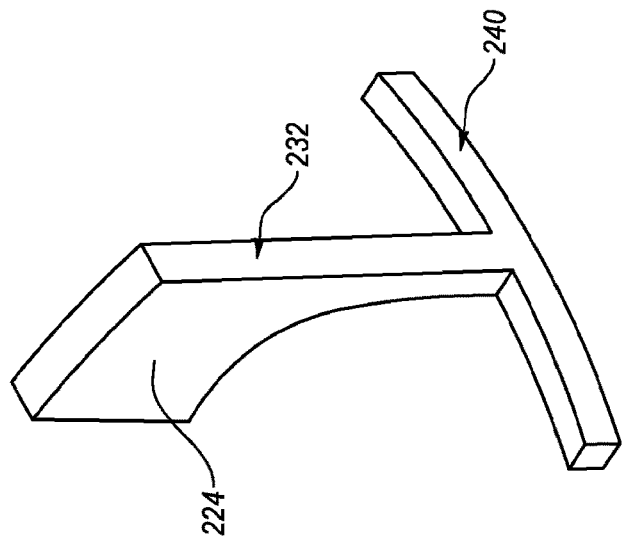
FIG. 12 is a perspective view of a valve member leg according to embodiments of the present disclosure.

In one or more embodiments, at least one leg may have a non-uniform width, specifically, with a width greater at the distal end of the leg, than the proximal end of the leg, adjacent the shaft of leg portion. Such embodiments may be used in conjunction with a two-piece valve member construction as described above, or may also be used on single piece valve members or valve members welded from two pieces. Referring now to FIG. 12, a perspective view of a valve member leg in accordance with embodiments of the present disclosure is shown. In such embodiments, at least one leg 224 may have a projection 240 extending a distance circumferentially from at least the face-distal side 232 and positioned to make contact with an inner bore of a valve seat within a valve. The projection 240 may have a front profile shape that is substantially rectangular or rounded with tapered ends; however the projection may have any shape such that it may contact the inner bore of a valve seat within a valve. For example, the projection 240 may have a rounded shape as shown in FIG. 13. Such projections may provide additional bearing surface area to stabilize a two-legged, three-legged, or four-legged valve member when translating in the inner bore of a valve seat within a valve. In some embodiments, the thickness of the leg may taper such that it is thickest at the face-distal side 232. Further, some embodiments may include at least one leg not including a projection but rather having an outwardly tapered leg such that at least a portion of the face-distal side is the widest part of the leg. For example, FIG. 14 shows a leg 224 including an outwardly taper along the entire face-distal side 232.

In some embodiments, the projection may have a width ranging from 1.5 to 4.0 times greater than the height, the width defined as the radial length of the projection and the height defined as the axial length of the projection between the intersecting points of the projection with the face-distal side, or a lower limit of any of 1.5, 2.0, 2.5, or 3 times greater than the height, an upper limit of any of 2.5, 3.0, 3.5, or 4.0 times greater than the height, where any lower limit can be used in combination with any upper limit. Furthermore, the projection width may be up to 4 times greater than the width of its leg face-distal side 232, or greater than 1, 1.5, 2.0, or 2.5 times greater than the width of the face-distal side 232 in other embodiments. In such embodiments, the summation of face-distal side arc lengths may be 15 to 35 percent of the circumference of the leg portion (or at least 15, 20, 25 or 35 percent in various embodiment), as compared to conventional valve members which have a summation of face-distal side arc lengths ranging from 7 to 10 percent of the circumference of the leg portion. In some embodiments, a leg may have a face-distal side with varying width, and its projection width may be up to 4 times greater than the thinnest point of its varying width.

Moreover, in various embodiments, it may also be desirable to "lengthen" the leg projections at the outer gage to increase valve stability, which may be in addition to or instead of leg width increases. Such increased leg length may be expressed based on the length relative to the height from the strike face. According to some embodiments, the leg face-distal side height may range from about 30 percent to about 65 percent of the distance between a distal end of the leg to the proximal surface of the base. However, according to other embodiments, the leg face-distal side height may be at least 75% percent of the distance between the distal end of the leg to the proximal surface of the base Although only a few example embodiments have been described in detail above, those skilled in the art will readily appreciate that many modifications are possible in the example embodiments without materially departing from this disclosure. Accordingly, all such modifications are intended to be included within the scope of this disclosure.

What is claimed:

1. A method for joining a valve member for use within a valve, the method comprising:
   brazing a body portion having a head and a base, the base comprising a bore including a cylindrical bore shape extending a depth therein, to a leg portion having a shaft, wherein the bore includes at least one axial groove in an inner circumferential wall extending from a periphery of the bore axially into the body portion, the shaft including a cylindrical shaft shape and comprising:
   a distal end;
   a proximal end opposite the distal end, the proximal end having a reduced diameter; and
   a plurality of legs extending radially and axially therefrom and away from the proximal end;
   the brazing comprising:
   placing a braze material between the bore and the proximal end;
   inserting the proximal end into the bore such that a portion of an outer surface of the proximal end is adjacent to an inner surface of the bore; and
   heating at least the adjacent surfaces to a braze temperature.

2. The method of claim 1, wherein the braze temperature ranges from 2,000 to 2,300 degrees Fahrenheit.

3. The method of claim 2, further comprising heat treating the brazed valve member at a temperature ranging from 1,600 to 1,800 degrees Fahrenheit for a period ranging from 10 to 14 hours.

4. The method of claim 3, wherein the heating and heat treating steps are carried out in contiguous zones within a furnace.

5. The method of claim 1, wherein the braze material is aluminum, copper, nickel, or combinations or alloys thereof.

6. The method of claim 1, wherein a ratio of bore depth to body portion height ranges from 0.05 to 1.00.

7. The method of claim 1, wherein a ratio of bore diameter to body diameter ranges from 0.10 to 0.60.

8. A valve member for use within a valve, the valve member comprising:
   a body portion having a head and a base, a head diameter of the head being larger than a base diameter of the base, wherein the base comprises a bore with a cylindrical bore shape extending a depth therethrough, a proximal surface of the base radially surrounding the bore, the bore including an axial groove extending from the proximal surface away from the proximal surface, the body portion including a side section interposed axially between the head and the base, the side section including a sealing element extending circumferentially around the side section and configured to make contact with a valve seat; and
   a leg portion having a distal end and a proximal end opposite the distal end, the leg portion including a shaft with a cylindrical shaft shape, the shaft including a reduced diameter section extending from the proximal end towards the distal end, a shoulder being located between the shaft and the reduced diameter section, the shaft including a plurality of legs extending radially and axially therefrom, the reduced diameter section of the shaft being inserted into the bore and brazed to the body portion.

9. The valve member of claim 8, wherein each leg has a face-proximal side directly facing the shaft and a face-distal side positioned to make contact with an inner bore of a valve seat within a valve.

10. The valve member of claim 9, wherein a total face-distal side arc length comprises 15 to 35 percent of the circumference of the leg portion.

11. The valve member of claim 10, wherein at least one leg has a projection extending a distance circumferentially from at least the face-distal side, the projection positioned to make contact with the inner bore of the valve seat within the valve.

12. The valve member of claim 11, wherein the projection width is up to 4 times greater than the leg width.

13. The valve member of claim 12, wherein the projection has a width to height ratio ranging from 1.5 to 4.

14. The valve member of claim 9, wherein the leg face-distal side height is at least 75% percent of the distance between the distal end of the leg to the proximal surface of the base.

15. A valve member for use within a valve, the valve member comprising:
   a body portion including a metallic body portion, the metallic body portion including a head and a base, the base including a bore extending a depth therethrough, the bore including at least one axial groove in an inner circumferential wall extending from a periphery of the bore axially into the metallic body portion; and
   a leg portion having a shaft and only three legs extending radially and axially therefrom, the leg portion including a metallic leg portion, a shaft of the metallic leg portion being inserted into the bore, wherein shaft is brazed to the base.

16. A valve member for use within a valve, the valve member comprising:
   a body including a metallic body portion including a head and a base, wherein the base includes a bore extending a depth therethrough, wherein the bore includes at least one axial groove in an inner circumferential wall extending from a periphery of the bore axially into the metallic body portion; and
   a leg portion having a shaft and a plurality of legs extending radially and axially therefrom, the leg portion including a metallic leg portion, a shaft of the metallic leg portion being inserted into the bore and brazed to the base, each leg having a face-proximal side directly facing the shaft and a face-distal side positioned to make contact with an inner bore of a valve seat within a valve, the face-distal side having a non-uniform width along a length of the leg, the face-distal side including a projection at a distal end of the leg.

17. The valve member of claim 16, wherein the projection is positioned to make contact with the inner bore of the valve seat within the valve, wherein the projection width is up to 4 times greater than the leg width.

18. The valve member of claim 16, the head having a larger diameter than the base.

19. The valve member of claim 16, wherein the axial groove extends at least 50% of a bore depth into the bore.

* * * * *